United States Patent [19]
Doan

[11] Patent Number: 5,501,478
[45] Date of Patent: Mar. 26, 1996

[54] OCCUPANT PROPELLED THREE WHEELED VEHICLE

[75] Inventor: David G. Doan, Reynoldsville, Pa.

[73] Assignee: Robert L. Doan, ReIyldsville, Pa.

[21] Appl. No.: 483,708

[22] Filed: Jun. 7, 1995

[51] Int. Cl.$^6$ .............................. B62K 5/02; B62K 5/08; B62M 1/00
[52] U.S. Cl. ........................ 280/282; 280/62; 280/220; 280/267
[58] Field of Search ..................... 280/236, 267, 280/268, 269, 282, 288.1, 62, 220

[56] References Cited

U.S. PATENT DOCUMENTS

| | | |
|---|---|---|
| 354,642 | 12/1886 | Linley et al. . |
| 906,293 | 1/1908 | Robinson . |
| 2,207,161 | 7/1940 | Roe . |
| 3,311,388 | 3/1967 | Ryan et al. . |
| 3,403,927 | 10/1968 | Rettger, Jr. . |
| 3,669,468 | 6/1972 | Rich . |
| 3,909,043 | 9/1975 | Black . |
| 3,981,516 | 9/1976 | Haggkvist . |
| 4,103,921 | 8/1978 | Brooks et al. . |
| 4,198,072 | 4/1980 | Hopkins . |
| 4,279,429 | 7/1981 | Hopkins et al. . |
| 4,432,561 | 2/1984 | Feikema et al. . |
| 4,456,277 | 6/1984 | Carpenter . |
| 4,497,502 | 2/1985 | Forbes et al. . |
| 4,526,392 | 7/1985 | Berkstresser . |
| 4,548,421 | 10/1985 | Wiener . |
| 4,572,535 | 2/1986 | Stewart et al. . |
| 4,580,802 | 4/1986 | Herman et al. . |
| 4,789,173 | 12/1988 | Lofgren et al. . |
| 4,799,704 | 1/1989 | Colarusso . |
| 4,826,190 | 5/1989 | Hartmann . |
| 4,925,202 | 5/1990 | Barker . |

FOREIGN PATENT DOCUMENTS

| | | |
|---|---|---|
| 3540976 | 5/1987 | Germany . |
| 1745608 | 1/1990 | U.S.S.R. . |

Primary Examiner—Mitchell J. Hill
Attorney, Agent, or Firm—Banner & Allegretti, Ltd.

[57] ABSTRACT

An occupant propelled three wheeled vehicle, e.g., a tricycle, includes a frame, a seat, a front driven wheel, two laterally spaced steerable rear wheels and handlebar steering mechanism. The front wheel is driven via a gear and chain arrangement by a pedal assembly which is located at least partially rearwardly of the front wheel axis. The handlebar steering mechanism is located forward of the seat and controls the steering of the rear wheels by simultaneously rotating each rear wheel about a respective vertical axis. The handlebar steering mechanism includes levers which independently control the braking of the two rear wheels and the front wheel. The handlebar steering mechanism also includes a gear shift lever permitting the user to selectively choose a desired gearing ratio between the pedal assembly and the front drive wheel. The seat is positioned with respect to the pedal assembly for substantially upright pedalling, as opposed to recumbent pedalling. The seat is independently vertically, longitudinally, and angularly adjustable with respect to the frame.

20 Claims, 6 Drawing Sheets 5,501,478

OCCUPANT PROPELLED THREE WHEELED VEHICLE

FIELD OF THE INVENTION

The present invention relates to an occupant propelled three wheeled vehicle. More specifically, the invention relates to an occupant propelled three wheeled cycle having a single driven front wheel, two steerable rear wheels, and numerous other features facilitating use by senior citizens and physically challenged riders.

BACKGROUND OF THE INVENTION

Existing occupant propelled cycles have included three wheeled vehicles, i.e., tricycles. However, these three wheeled vehicles are typically designed as either speed performance cycles for racing enthusiasts, or as toys for small children. Use of these three wheeled vehicles by some senior citizens or physically challenged riders may be impossible, dangerous, impractical, and/or uncomfortable. Accordingly, existing occupant propelled three wheeled vehicles are unsatisfactory for some users.

U.S. Pat. Nos. 4,198,072, 4,432,561, 4,279,429, 4,799, 704, 4,497,502, 3,981,516, and 4,572,535 are directed to occupant propelled three wheeled recumbent cycles which are designed to increase speed, steering response, maneuverability, and provide other features which may be beneficial for racing enthusiasts. Some of these features include reducing the wind resistance, pivotally attaching a portion of the frame so the user can lean into a turn, providing a steering assembly which places the user's hands immediately adjacent the road surface, lowering the center of gravity of the cycle. However, these and other features associated with these cycles make the cycles too difficult to control or otherwise unsatisfactory for many users. Additionally, these cycles are inherently deficient for many users because their recumbent nature and the closeness of their seats to the ground make them uncomfortable and very difficult to mount and dismount. Further, these prior art cycles are typically too unstable and/or may cause a perception of instability for many users.

U.S. Pat. Nos. 4,103,921, 3,909,043, 3,669,468, 3,311, 388, and 2,207,161 are apparently directed to three wheeled toy cycles for children. While these three wheeled cycles may be sufficient for use by many children, these cycles are obviously unsuitable for many users, including some senior citizens or physically challenged riders. Primarily, these cycles are proportioned and sized such that many users would be uncomfortable and/or unable to operate. Additionally, some of these cycles are recumbent, which can be disadvantageous for the reasons described supra. Further, many of these cycles are specifically intended for fast and sharp turns. While such steering arrangements may be desirable in toy cycles for children, these steering arrangements tend to make the cycle less safe, which is clearly undesirable for many other users.

SUMMARY OF THE INVENTION

In view of the foregoing, it is a principal object of the present invention to provide an improved three wheeled occupant propelled vehicle which overcomes the problems associated with prior art three wheeled occupant propelled vehicles.

Another object is to provide a three wheeled occupant propelled vehicle for seniors, physically challenged riders, and other users which can more accurately and safely be driven.

Further, it is an object to provide a three-wheeled cycle with an adjustable seat system to maximize comfort, function, and safety.

These and other objects are achieved by the present invention which, according to one aspect, provides a tricycle having an elongated frame, a ground engaging from drive wheel, right and left ground engaging rear wheels, a pedal assembly, a power coupling device, a seat, a steering assembly, and a braking mechanism. The frame includes a forward portion and a rearward portion. The from drive wheel is mounted for rotation about a transverse horizontal axis at the forward portion of the frame. The rear wheels are each mounted for rotation about a transverse horizontal axis at the rearward portion of the frame, and are each further rotatably attached to the frame for pivotal movement about a respective vertical steering axis. The pedal assembly is at least partially rearwardly displaced from the from drive wheel axis, and includes a pair of pedals mounted for rotation about a transverse horizontal pedalling axis. The power coupling means device is coupled to the pedal assembly and the from drive wheel for transmitting rotational power therebetween. The seat is mounted to the frame longitudinally between the transverse horizontal axis of rotation of the rear wheels and the pedalling axis for supporting a user for upright pedalling of the tricycle. The steering assembly includes a rotatable steering shaft and a steering member attached thereto. The rotatable steering shaft is coupled to both rear wheels for angularly displacing each rear wheel with respect to its respective vertical steering axis. The braking mechanism applies a braking force to at least one of the wheels.

In yet another aspect, the invention provides an occupant-propelled tricycle intended for use by seniors or physically challenged riders. The tricycle includes an elongated frame, a ground engaging front drive wheel, right and left ground engaging rear wheels, a pedal assembly, a power coupling device, a seat, a plurality of vertical telescopically mounted rods, a plurality of seat mounting members, a steering assembly, and a braking mechanism. The frame includes a forward portion and a rearward portion. The front drive wheel is mounted for rotation about a transverse horizontal axis at the forward portion of the frame. The rear wheels are each mounted for rotation about a transverse horizontal axis at the rearward portion of the frame, and are each further rotatably attached to the frame for pivotal movement about a respective vertical steering axis. The pedal assembly is at least partially rearwardly displaced from the front drive wheel axis, and includes a pair of pedals mounted for rotation about a transverse horizontal pedalling axis. The power coupling means device is coupled to the pedal assembly and the front drive wheel for transmitting rotational power therebetween. The seat includes a hip support section and a back support section, and is mounted to the frame longitudinally between the transverse horizontal axis of rotation of the rear wheels and the pedalling axis for supporting a user for upright pedalling of the tricycle. The plurality of vertical telescopically mounted rods enable independent vertical and angular adjustment of the seat with respect to the frame. The plurality of seat mounting members are coupled to the vertical telescopically mounted rods to enable longitudinal adjustment of the seat with respect to the frame. The vertical telescopically mounted rods and the seat mounting members permit independent vertical and longitudinal adjustment of the seat with respect to the frame for upright pedalling in a plurality of pedalling position angles in the range between 25° and 45° when the hip support section of the seat is substantially horizontally disposed. The steering assembly includes a rotatable steering shaft and a steering member attached thereto. The rotatable steering shaft is coupled to both rear wheels for angularly displacing each rear wheel with respect to its respective vertical steering axis. The braking mechanism applies a braking force to at least one of the wheels.

In another aspect, the invention provides an occupant-propelled tricycle intended for use by seniors or physically challenged riders. The tricycle includes an elongated frame, a ground engaging front drive wheel, right and left ground engaging rear wheels, a pedal assembly, a power coupling device, a seat, a rotatable steering shaft, a steering member attached to the rotatable steering shaft, an abutment member, a first longitudinally-oriented coupling rod, a second laterally-oriented coupling rod, a third laterally-oriented coupling rod, and a bracket. The frame includes a forward portion and a rearward portion. The front drive wheel is mounted for rotation about a transverse horizontal axis at the forward portion of the frame. The rear wheels are each mounted for rotation about a transverse horizontal axis at the rearward portion of the frame, and are each further rotatably attached to the frame for pivotal movement about a respective vertical steering axis. The pedal assembly is at least partially rearwardly displaced from the front drive wheel axis, and includes a pair of pedals mounted for rotation about a transverse horizontal pedalling axis. The power coupling means device is coupled to the pedal assembly and the from drive wheel for transmitting rotational power therebetween. The seat is adjustably mounted to the frame longitudinally between the transverse horizontal axis of rotation of the rear wheels and the pedalling axis for supporting a user for upright pedalling of the tricycle. The abutment member is located immediately adjacent a lower portion of the rotatable steering shaft for physically limiting the angular displacement of the rotatable steering shaft with respect to the frame. The first coupling rod has a front end coupled to the rotatable steering shaft and a rear end attached to the bracket. The second coupling rod has a first end coupled to one of the rear wheels and a second end attached to the bracket. The bracket is pivotally mounted to the frame, and translates longitudinal movement of the first coupling rod into lateral movement of the second coupling rod. The third coupling rod has first and second ends each coupled to a rear wheel. The rotation of the handlebars causes longitudinal displacement of the first coupling rod, rotation of the bracket, lateral displacement of the second coupling rod, lateral displacement of the third coupling rod, and angular displacement of each rear wheel with respect to its respective vertical steering axis.

These and other objects and features of the invention will be apparent upon consideration of the following detailed description of preferred embodiments thereof, presented in connection with the following drawings in which like reference numerals identify like elements throughout.

DETAILED DESCRIPTION OF THE PREFERRED EMBODIMENT

Figure 1:
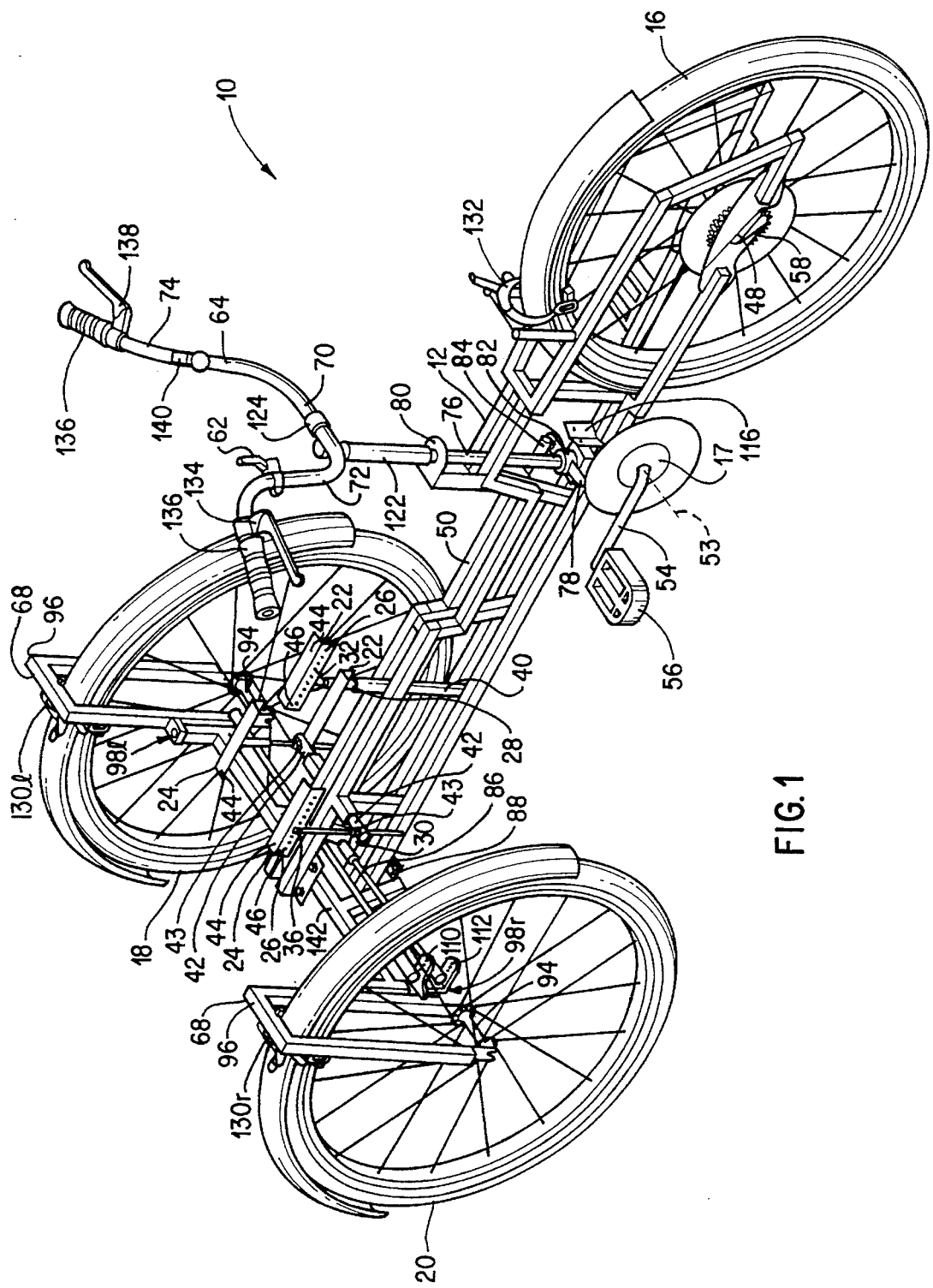
FIG. 1 is a perspective view of the three wheeled occupant propelled vehicle, shown with the seat removed.

In the present invention, as pictured in FIGS. 1–8, an occupant propelled three wheeled vehicle, e.g., a tricycle, is designated generally by reference numeral 10. It should be apparent that occupant propelled tricycle 10 is an upright cycle as opposed to a recumbent cycle. In a recumbent cycle, the user's lower portion, i.e., the waist, legs, and feet, tends to be parallel to the supporting surface, e.g., the road. In contrast, in an upright cycle, the user tends to be more erect with his feet significantly disposed below his waist.

Three wheeled cycle 10 includes a frame 12, a seat 14, a front wheel 16, and two laterally spaced rear wheels 18 and 20. As described in detail hereinafter, three wheeled cycle 10 includes a seat adjustment system, a power transfer or drive system including a pedal assembly 17 permitting the user to propel the cycle 10, a steering system for directing cycle 10, and a braking system for slowing or stopping cycle 10. These systems are designed in such a manner so that three wheeled cycle 10 is a safe, comfortable, and practical transportation device for almost all potential users including most senior citizens and physically challenged riders.

Figure 2:
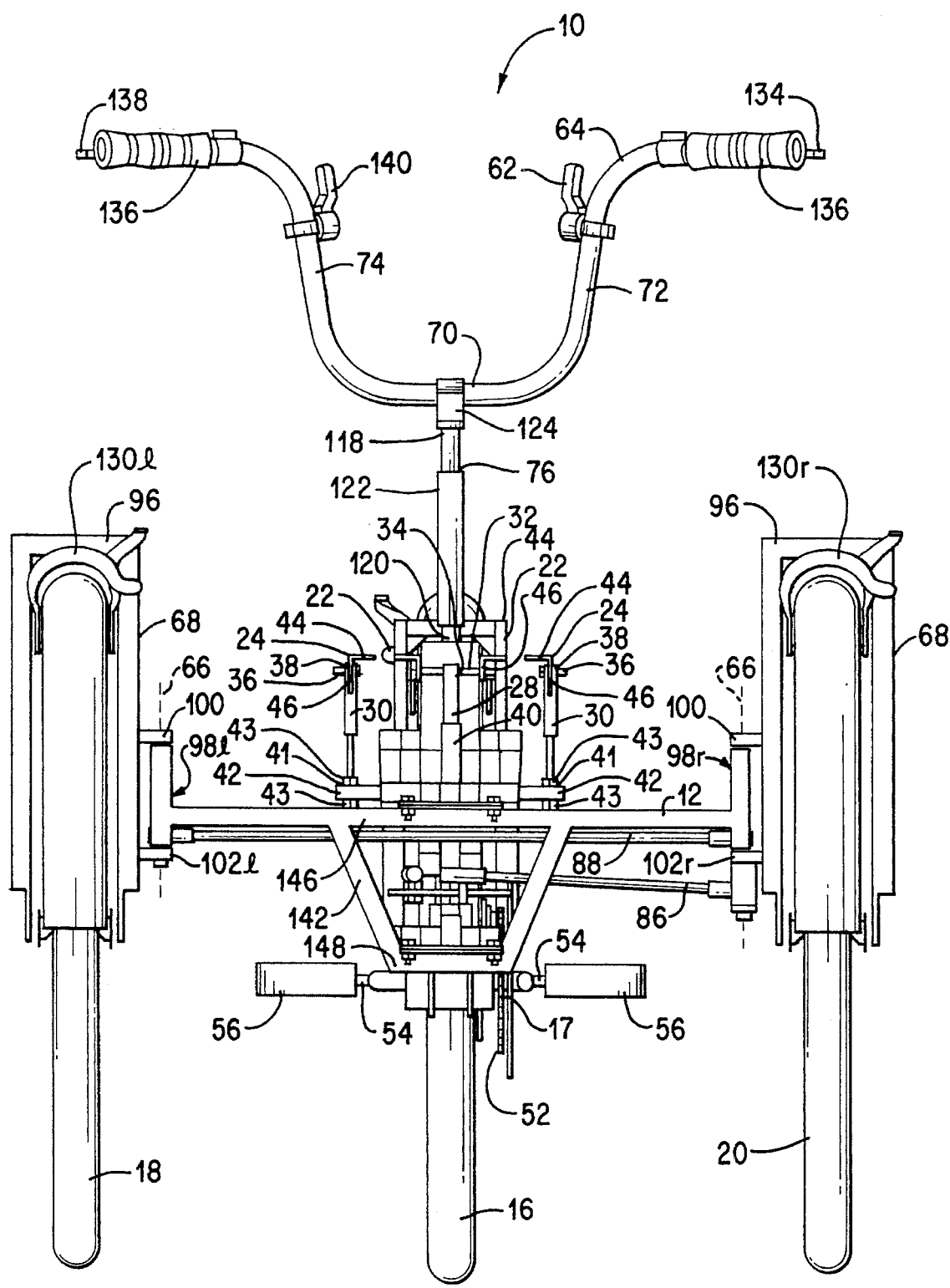
FIG. 2 is a rear elevational view of the three wheeled occupant propelled vehicle, as shown in FIG. 1.
Figure 3:
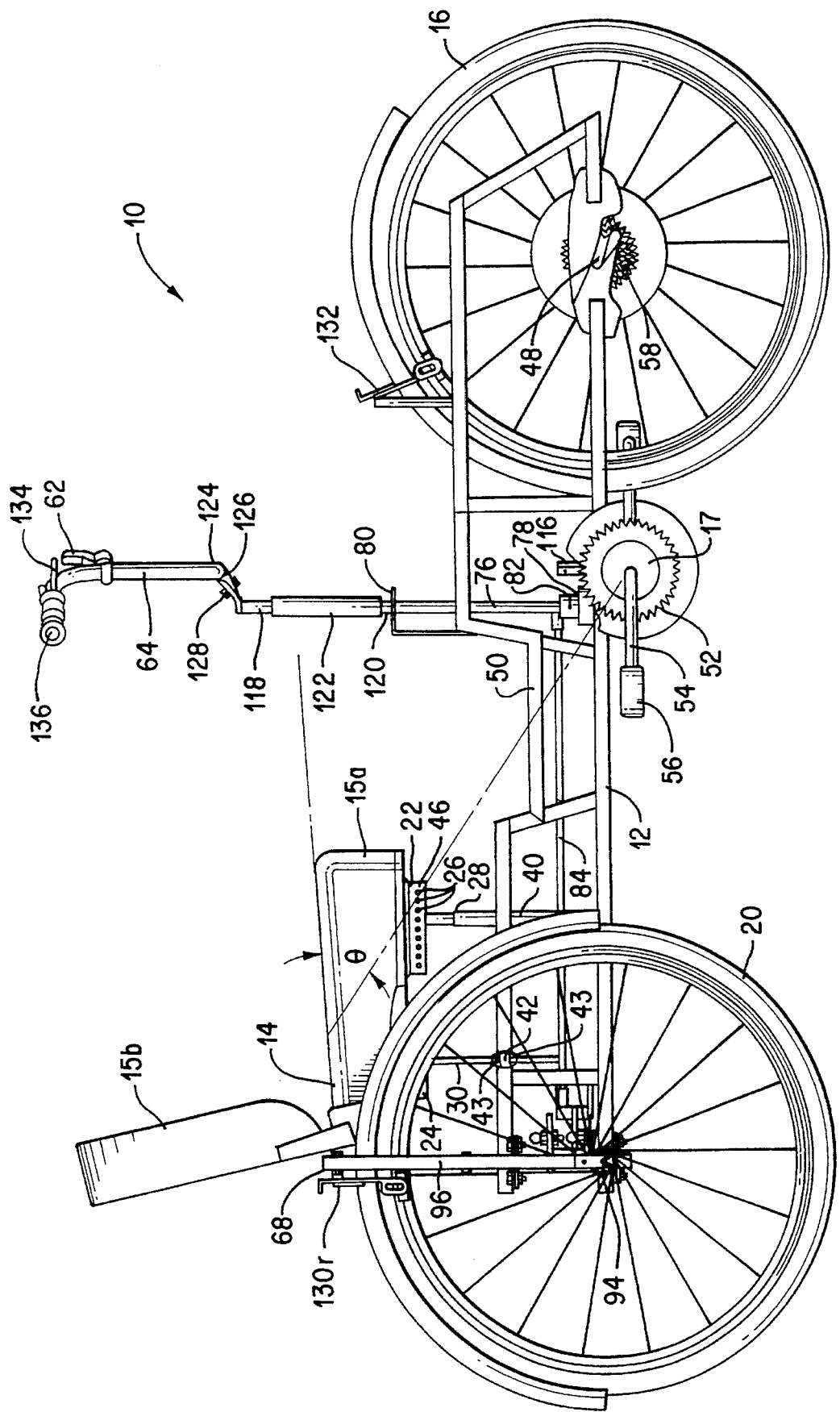
FIG. 3 is a side elevational view of the three wheeled occupant propelled vehicle illustrated in FIG. 1 and shown with the seat attached.
Figure 4:
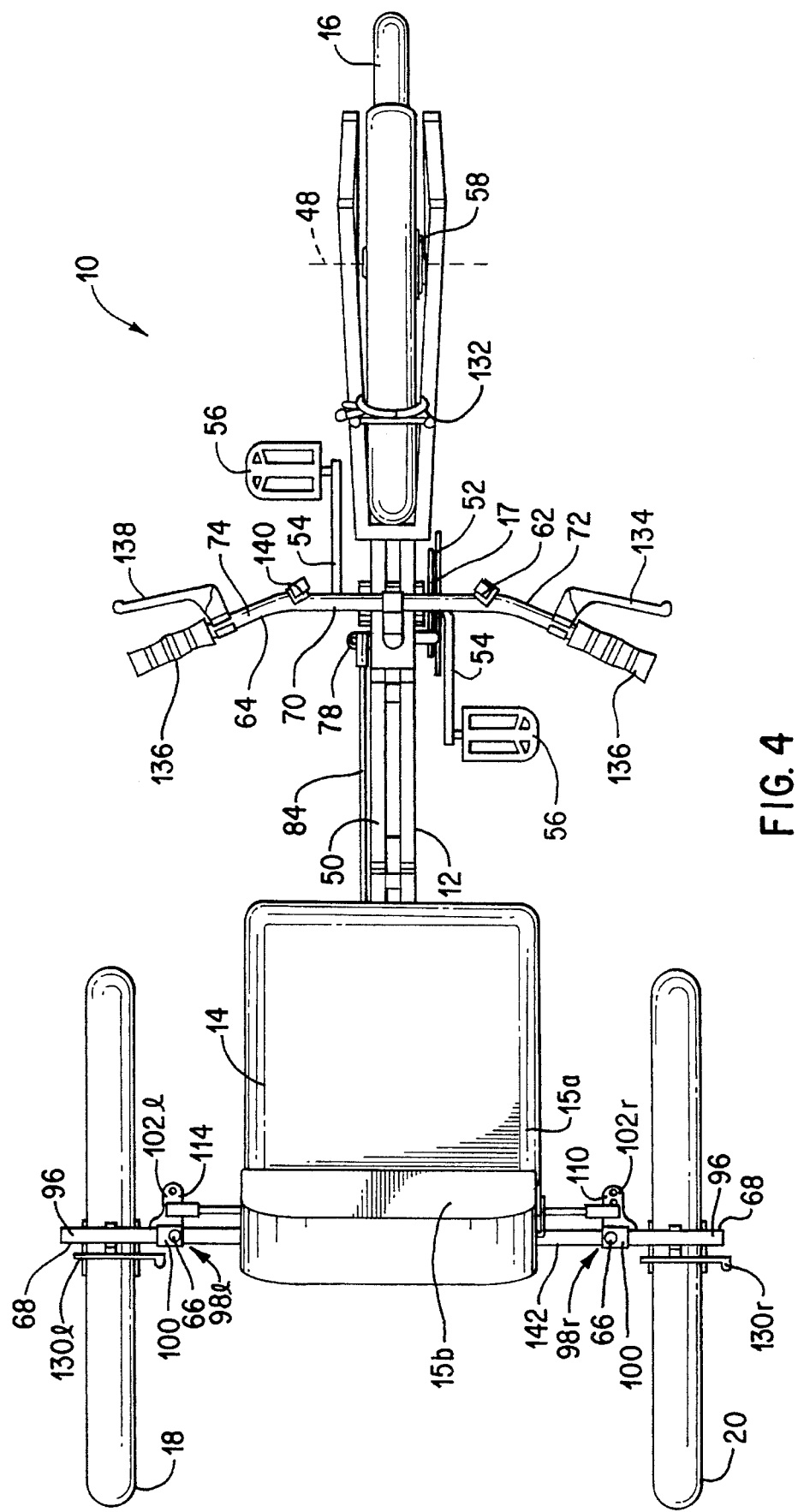
FIG. 4 is a top plan view of the three wheeled occupant propelled vehicle as shown in FIG. 3.
Figure 5:
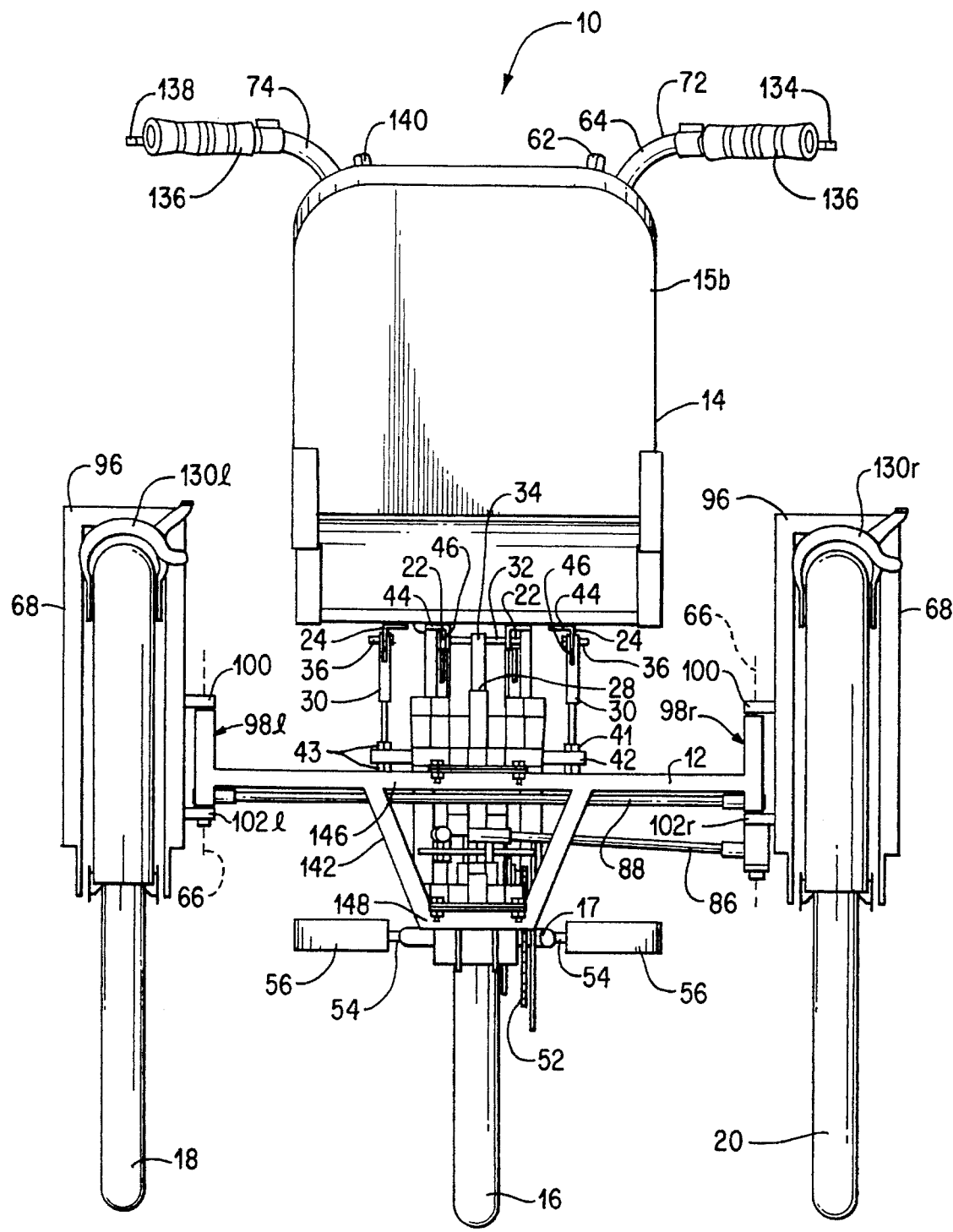
FIG. 5 is a rear elevational view of the three wheeled occupant propelled vehicle as shown in FIG. 3.
Figure 8:
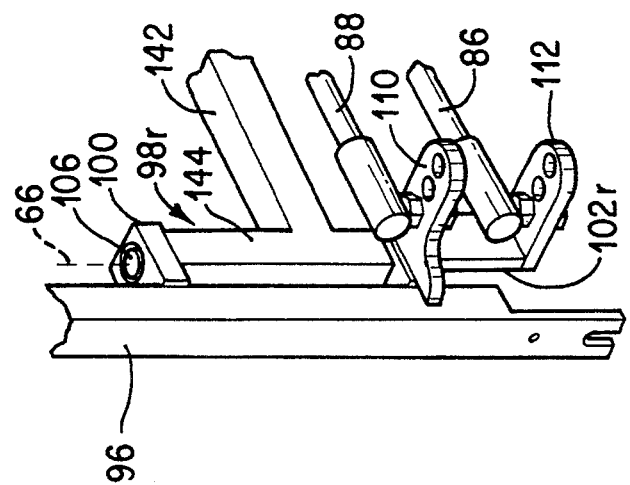
FIG. 8 is a perspective view of the rear side portion of the steering assembly adjacent the right rear wheel.

As illustrated in FIGS. 3–5, seat 14 includes a hip support section 15a and a back support section 15b, and is longitudinally, vertically, and angularly adjustable with respect to frame 12 to obtain maximum functionality, safety, and comfort for each user. As shown in FIGS. 1–3, seat adjustment system includes two laterally spaced front mounting brackets 22 and two laterally spaced rear mounting brackets 24, each fixedly attached to the bottom of hip support section 15a of seat 14. Brackets 22 and 24 each include a series of longitudinally spaced mounting holes 26 for coupling seat 14 to a front vertically telescopic rod 28 or to one of a pair of rear vertically telescopic rods 30.

Both front mounting brackets 22 are attached to a single front vertically telescopic rod 28 by a front connecting rod 32 which extends through a hole 26 in each of front mounting brackets 22 and through a horizontal bore hole 34 in front vertically telescopic rod 28. The ends of front connecting rod 32 are preferably threaded, and conventional hardware, i.e., washers and bolts, may be used to retain front connecting rod 32 within holes 26 and 34 and fixedly attach the front portion of seat 14 to front vertically telescopic rod 28.

Rear mounting brackets 24 are each attached to a respective rear vertically telescopic rod 30 by a rear connecting rod 36. Each rear connecting rod 36 extends through a hole 26 in its respective rear mounting bracket 24 and through a horizontal bore hole 38 in its respective rear vertically telescopic rod 30. One end of each rear connecting rod 36 is preferably enlarged so as to have a diameter larger than that of its adjacent hole 26 or 38, while the other end of each rear connecting rod 36 is preferably threaded. Conventional hardware, i.e., washers and bolts, may be used to retain each rear connecting rod 36 within respective holes 26 and 38, and fixedly attach the rear portion of seat 14 to rear vertically telescopic rods 30. In one preferred embodiment, bolts with threaded ends are used as rear connecting rods 36. Alternatively, in lieu of threaded ends, front and rear connecting rods 32 and 36 can include holes therein and be fixedly coupled to brackets 22 and 24 by cotter pins, or other fastening hardware.

Front and rear vertically telescopic rods 28 and 30 are each vertically movable with respect to frame 12. In the preferred embodiment, front telescopic rod 28 is vertically movable inside, and with respect to, a hollow guide post 40 which is fixed the body of frame 12. Front telescopic rod 28 can be releasably fixed with respect to guide post 40 by a conventional vertical position retention arrangement, not shown. Such vertical position retention arrangements include, but are not limited to, aligned holes and a cross pin, and a frictionally engaging holding member. In the preferred embodiment, rear telescopic rods 30 are each vertically movable inside a vertical bore hole 41 on a laterally projecting support 42 fixed to frame 12. The lower portion of each rear telescopic rod 30 is threaded so the vertical position of each rear telescopic rod 30 can be adjustably and fixedly maintained by bolts 43 on opposing sides of bore hole 41. Further, while the figures depict vertically movable telescopic rods 28 and 30 as inner rods which are guided within a fixed outer sleeve 40 or 41, it is recognized that one or more of rods 28 and 30 could be a hollow outer sleeve which is guided around, and vertically movable with respect to, a fixed inner rod.

Further, in a preferred embodiment, front and rear mounting brackets 22 and 24 are L-shaped defining an upper horizontal portion 44 and a vertically extending portion 46 extending downward therefrom. Each horizontal portion 44 is attached to the bottom of hip support section 15a of seat 14 by a conventional attachment arrangement, e.g., a weld, fastening hardware, an adhesive, etc. Each vertical portion 46 contains mounting holes 26 therein for purposes as previously described.

To longitudinally adjust seat 14 with respect to frame 12, connecting rods 32 and 36 are removed and reattached to different mounting holes 26. For example, attaching connecting rods 32 and 36 to mounting holes 26 which are located forwardly or rearwardly of the previously used mounting holes 26 will longitudinally adjust seat 14 rearwardly or forwardly, respectively.

To vertically adjust seat 14 with respect to frame 12, the vertical position retention arrangement for front vertically telescopic rod 28 is released, and bolts 43 are rotated away from laterally projecting support 42, and telescopic rods 28 and 30 are raised or lowered by an equal distance to vertically adjust seat 14 upwardly or downwardly, respectively. Upon reaching the desired height, vertical position retention arrangements for front vertically telescopic rod 28 is refastened, and bolts 43 are tightened against laterally projecting support 42.

Angularly adjusting seat 14 with respect to frame 12 includes releasing the vertical position retention arrangement and loosening bolts 43 as described above, and raising or lowering front telescopic rod 28 and rear telescopic rods 30 by an unequal distance. Raising or lowering front telescopic rod 28 by an amount greater than rear telescopic rods 30 will increase or decrease, respectively, the angle of seat 14. Upon reaching the desired seating angle, vertical position retention arrangements for front vertically telescopic rod 28 is refastened, and bolts 43 are tightened against laterally projecting support 42. If desired, telescopic rods 28 and 30 may be coupled together to facilitate the vertical adjustment of seat 14. However, such an arrangement would prevent the angular adjustment of seat 14.

Thus, the seat adjustment system of three wheeled cycle 10 maximizes comfort and functionality. Further, as the pedalling axis 53 of pedal assembly 17 is located rearwardly of the axis 48 of front wheel 16, the vertical, angular, and longitudinal adjustability of seat 14 permits the optimal upright pedalling position for balance and stability, as well as comfort, for each user. The pedalling position angle for each user is defined as the angle between (i) a line between the top of hip support section 15a of seat 14 which would normally support the user's buttocks and the central pedalling axis 53 of pedal assembly 17 and (ii) a plane along the upper surface of hip support section 15a at the point which supports the user's buttocks. The adjustability of seat 14 with respect to frame 12 and pedal assembly 17, permits numerous selective pedalling position angles $\Theta$. With the upper surface of hip support section 15a in a generally horizontal orientation, seat 14 is vertically and longitudinally adjustable to provide essentially unlimited pedalling position angles $\Theta$ between approximately 25° and 45°.

Additionally, the positioning of adjustable seat 14 with respect to frame 12 and the cycle supporting surface, e.g. the ground, achieves additional advantages for many users. Seat 14 is positioned with respect to frame 12 at a height which is sufficient for a user to pedal in a comfortable upright position, but low enough that there is a stable center of gravity, and the user can put both feet on the ground. Further, frame 12 includes a recessed section or step 50 located longitudinally forward of, and adjacent to, the front of seat 14 to provide a foot supporting surface enabling easy mounting and dismounting.

As best shown in FIGS. 1, 3, and 4, the power transfer or drive system permits the user to impart rotational force to front wheel 16 for propelling cycle 10. Drive system incorporates a standard bicycle drive train assembly which includes pedal assembly 17 having a drive sprocket 52 with oppositely extending crank arms 54 and pedals 56, a driven sprocket 58 mounted on axle 48 of front wheel 16, and a sprocket chain, not shown, joining the drive sprocket 52 and a driven sprocket 58. Pedal assembly 17, sprockets 52 and 58, and the sprocket chain include structure permitting multiple gear usage and gear changing structure, in a manner known in the art. The user changes gears by shifting a gear selector lever 62 conveniently positioned on handlebars 64.

It should be recognized that in a preferred embodiment, the lower gears provide a lower pedalling resistance than the lower gears in a conventional bicycle gearing system. This provision is preferably achieved by the appropriate sizing of the gears, i.e., the sprockets. The lower gearing aids and encourages injured, tired, weak, or physically challenged users.

The steering system permits the user to steer cycle 10 in a desired direction, via the simultaneous rotation of steerable rear wheels 18 and 20 about a respective vertical axis 66, by rotating the handlebars 64. The steering system includes handlebars 64 which are movably coupled to both rear wheel assemblies 68 by a plurality of steering linkages or rods. In sum, rotating handlebars 64 longitudinally moves front-to-rear steering rod 84, which laterally moves single wheel turning rod 86 causing right rear wheel 20 to rotate about its respective vertical steering axis 66, which laterally moves wheel-to-wheel coupling steering rod 88 to rotate left rear wheel 18 about its respective vertical steering axis 66.

Figure 6:
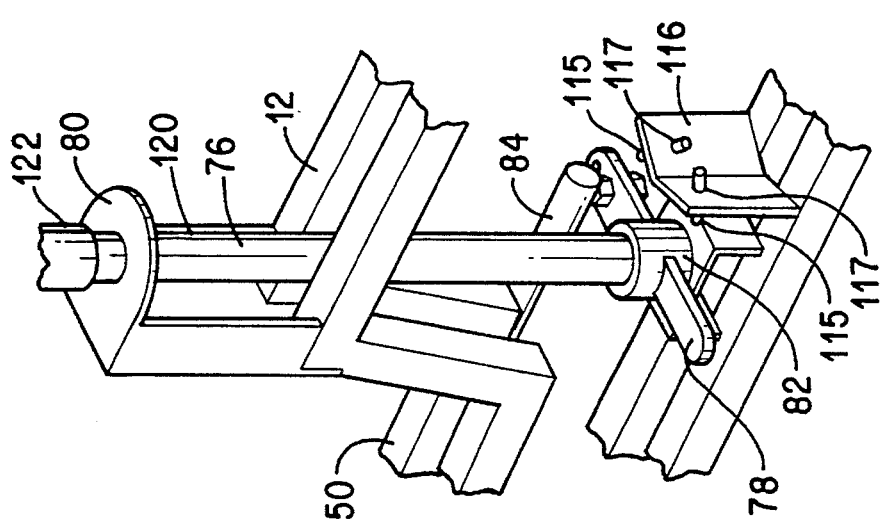
FIG. 6 is a perspective view of the lower front portion of the steering assembly.

Handlebars 64 include a center portion 70 and right and left winged portions 72 and 74 extending therefrom. Center portion 70 is attached to a vertical steering shaft 76 which is mounted for rotation about its central axis inside upper and lower steering mounting brackets 80 and 82, as illustrated in FIG. 6. Upper and lower mounting steering mounted brackets 80 and 82 are fixedly attached to frame 12 and contain lifetime lubricated bearings, not shown, for reducing the rotational friction of steering shaft 76. A winged bracket 78 is fixedly attached to vertical steering shaft 76 adjacent its lower end for coupling to the front end of front-to-rear steering rod 84.

Figure 7:
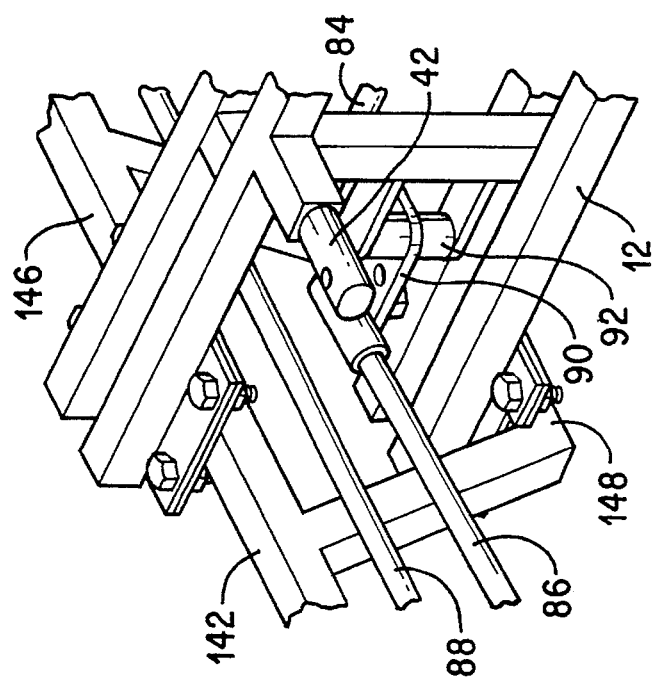
FIG. 7 is a perspective view of the rear center portion of the steering assembly.

As seen in FIG. 7, the rear end of front-to-rear steering rod 84 is attached to central rear steering bracket 90. Central rear steering bracket 90 is also attached to one end of single wheel turning rod 86, and is pivotally mounted to frame 12, via spindle assembly 92 for pivotal movement about a vertical axis. Central rear steering bracket translates longitudinal movement of front-to-rear steering rod 84 to lateral movement of single wheel turning rod 86. The other end of single wheel turning rod 86 is coupled to right wheel assembly 68 as described hereinafter. Wheel-to-wheel coupling steering rod 88 is connected at each end to a respective wheel assembly 68 so each rear wheel is simultaneously rotated an equal angular amount about its respective vertical axis 66.

As seen in FIGS. 1, 2, 4, 5, and 8, each wheel assembly 68 includes a wheel 18 or 20 mounted for travelling rotation about a horizontal axle 94, an inverted U-shaped bracket 96 attached to both ends of axle 94, and a steering bracket interface 98r or 98l having an upper interfacing portion 100 and a lower interfacing portion 102r or 102l. Each steering bracket interface 98 is mounted to frame 12 by a respective king pin 106, for rotation about its vertical steering axis 66. King pin 106 and its interfacing sleeve preferably include lifetime lubricated bearings for facilitating rotation of the rear wheels.

Lower interfacing portion 102r of right steering bracket interface 98r includes a steering bar coupling bracket having two horizontal plates 110 and 112 for attachment to the right ends of lateral steering rods 86 and 88. Lower interfacing portion 102l of left steering bracket interface 98l includes a steering bar coupling bracket having only one horizontal plate 114 for attachment to the left end of wheel-to-wheel steering coupling rod 88. Single wheel turning rod 86 is attached at its right end to lower horizontal plate 112 on lower interfacing portion 102r of right steering bracket interface 98r, and is attached at its left end to central rear steering bracket 90. Wheel-to-wheel steering coupling rod 88 is attached at its right end to upper horizontal plate 110 on lower interfacing portion 102r of right steering bracket interface 98r, and at its left end to horizontal plate 114 on lower interfacing portion 102l of left steering bracket interface 98l. In a preferred embodiment, the steering rods 84, 86, and 88 are attached to their respective steering brackets and plates 76, 90, 110, 112, and 114 in any conventional manner including conventional attachment hardware, e.g., nuts and bolts.

To steer cycle 10, the user rotates handlebars 64 which rotationally displaces vertical steering shaft 74 by an equal angular amount. The rotational displacement of vertical steering shaft 76 longitudinally displaces front-to-rear steering rod 84. The longitudinal displacement of front-to-rear steering rod 84 rotates rear steering bracket 90 about spindle 92. As rear steering bracket 90 rotates, it laterally moves single wheel turning rod 86, and causes right rear wheel 20 to turn about its vertical axis 66. As wheel-to-wheel coupling rod 88 connects the two wheel assemblies together, this also causes left rear wheel 18 to angularly displace about its vertical axis 66 by an equal amount. Thus, this steering arrangement, rear wheels 18 and 20 turn simultaneously and generally displace an equal angular amount. However, as they rotate about different axes, they are slightly independent from each other, making cycle 10 safer on sharp turns, reducing the effects of a wheel lock-up, and making cycle 10 less prone to skidding which could otherwise occur.

Further, a wedge shaped stop tab 116 having abutment pins 115 is located directly in front of front winged steering bracket 78 for limiting the maximum angle of turn of the rear wheels 18 and 20. As best seen in FIG. 6, pins 115 on stop tab 116 prevent the angular rotation of front winged steering bracket 78 by providing an abutment surface on the extremity of each pin 115. Thus, if a user tries to rotate handlebars 64 more than a predetermined angle in either direction when the wheels 18 and 20 are pointed in the longitudinal direction, the abutment surface on one of the pins 115 will prevent the further rotation of handlebars 64 by contacting and preventing further angular rotation of bracket 78. Each abutment pin 115 extends through a hole 117 on an opposing side of stop tab 116 and is preferably adjustably mounted thereto. As depicted in FIG. 6, abutment pins 115 and holes 117 may be threaded to provide the adjustability feature, and nuts or other hardware, not shown, may be used to further retain abutment pins 115 with respect to stop tab 116.

The adjustability of abutment pins 115 permit them to be selectively positioned with respect to stop tab 116 and bracket 78 to prevent rotation of winged steering bracket 78 at a desired angle based on the requirements of the user. For example, users who desire more safety and less of a turning radius would move abutment pins 115 closer to bracket 78 than users who prefer a larger turning radius in sacrifice of enhanced safety benefits. Additionally, the permitted angular displacement of handlebars 64 need not be, and is preferably not equal to, the angular rotation of rear wheels 18 and 20 about their respective vertical axis 66. For example, if the positioning of the rods 84, 86, and 88 with respect to brackets 78, 90, 110, 112, and 114 are such than the ratio of the angular displacement of handlebars 64 to the angular displacement of wheels 18 and 20 is 2:1, limiting handlebars 64 to 80° of angular displacement from center would limit the steering rotation of rear wheels 18 and 20 to 40° from the longitudinal axis. Therefore, this steering angle limiting arrangement produced by angle stop tab 116, abutment pins 115, and winged steering bracket 78 can greatly reduce the chance of upsetting cycle 10.

For steering convenience, comfort, and enhanced control, handlebars 64 adjust up and down, and tilt forward or back, making cycle 10 further accommodating to the needs of the user. To accomplish this, vertical steering shaft 76 includes an upper section 118, a lower section 120, and telescopic coupler 122 therebetween, as illustrated in FIG. 3. Telescopic coupler 122 can be of any conventional structure permitting the axial displacement of upper section 118 with respect to lower section 120, thus allowing handlebars 64 to be vertically adjustable with respect to frame 12.

Upper section 118 of vertical steering shaft 76 includes a handlebar retaining bracket 124 having a handlebar sleeve 126 and a tightening member schematically illustrated by reference numeral 128. By loosening tightening member 128, handlebars 64 may be angularly rotated about a lateral axis to angularly adjust handlebars 64 with respect to frame 12. Upon reaching the desired angular orientation of handlebars 64, tightening member 128 may be tightened to provide sufficient friction between bracket 124 and center portion 70 of handlebars 64 to retain handlebars 64 in the desired position.

The braking system permits the user to conveniently stop the rotation of any or all of the wheels 16, 18 or 20. The braking system includes brake mechanisms 130r and 130l on each rear wheel 18 and 20, and a brake mechanism 132 on front wheel 16. Brake mechanisms are conventional brake structures known in the art and are independently controlled by brake levers located on handlebars 64. Right rear brake lever 134 is located adjacent grip 136 on right winged portion 72 of handlebars 64, and left rear brake lever 138 is located adjacent grip 136 on left winged portion 74 of handlebars 64, for respectively controlling the actuation of right rear and left rear brake mechanisms 130r and 130l. Front brake lever 140 is located on left winged portion 74 of handlebars 64 inwardly of left rear brake lever 138, and controls the actuation front brake mechanism 132. Brake cables, not shown, are preferably used to couple the brake levers to their respective brake mechanism in a manner known in the art.

Braking controls, i.e., levers 134, 138, 140, permit safe and intuitive control of the braking of cycle 10. Right and left rear brake levers 134 and 138 are on the right and left sides of handlebars 64, respectively, and are conveniently used during most braking operations as the user's hands will likely be on grips 136. In the event the user is shifting gears and has moved his right hand to access laterally inwardly shifting lever 62, he can simultaneously move his left hand laterally inwardly to access front brake lever 140. In the event that braking is then required, the user can squeeze front brake lever 140 actuating front braking mechanism. This flexibility to apply the front brake or the rear brakes minimizes the possibility that the braking force will be applied unevenly and cause skidding.

Additionally, frame 12 is designed for strength, stability, and safety. As seen in FIGS. 1, 3 and 4, frame 12 is comprised of a plurality of support members welded together. The support members form generally upper and lower frame portions, each primarily including a pair of laterally spaced apart support members, with generally vertical joining members disposed therebetween joining the laterally spaced members and the upper and lower frame portions. A rear structural axle 142 is bolted to the longitudinal rear of the upper and lower frame portions to stabilize and balance rear wheels 18 and 20 with respect to frame 12. Rear structural axle 142 includes lateral end portions 144 for mounting rear wheel assemblies 68 as previously described, and a trapezoidal center section having an upper bar 146 and a lower bar 148. Upper portion of frame 12 is attached to upper bar 146, while lower portion of frame 12 is attached to lower bar 148.

While the embodiment as shown in the figures illustrate use for a single rider, frame 12 could be alternatively designed to include a longer rear portion and a longer seat. Such an arrangement would permit cycle 10 to accommodate one or more additional passengers.

The 3-wheeled cycle has advantages as it is designed to provide seniors with a self-propelled transportation device which can safely and easily be driven. Further, the 3-wheeled cycle provides advantages to seniors because of its seat position with respect to the pedals, the adjustability of its seat, and its added stability due to its size.

While particular embodiments of the invention have been shown and described, it is recognized that various modifications thereof will occur to those skilled in the art. Therefore, the scope of the herein-described invention shall be limited solely by the claims appended hereto.

What is claimed is:

1. An occupant-propelled tricycle comprising:

an elongated frame, said frame including a forward portion and a rearward portion;

a ground engaging front drive wheel, said front drive wheel mounted for rotation about a transverse horizontal axis at the forward portion of the frame;

right and left ground engaging rear wheels, said rear wheels each mounted for rotation about a transverse horizontal axis at the rearward portion of the frame, each said rear wheel further being rotatably attached to said frame for pivotal movement about a respective vertical steering axis;

a pedal assembly at least partially rearwardly displaced from said front drive wheel axis, said pedal assembly including a pair of pedals mounted for rotation about a transverse horizontal pedalling axis;

power coupling means coupled to the pedal assembly and the front drive wheel for transmitting rotational power therebetween;

a seat mounted to the frame longitudinally between the transverse horizontal axis of rotation of the rear wheels and the pedalling axis for supporting a user for upright pedalling of the tricycle;

a steering assembly, said steering assembly includes a rotatable steering shaft and a steering member attached thereto, said rotatable steering shaft coupled to both said rear wheels for angularly displacing each said rear wheel with respect to its respective vertical steering axis; and a braking mechanism for applying a braking force to at least one of said wheels.

2. The tricycle of claim 1, wherein said from drive wheel is non-steerable, said steering member comprises handlebars, and said steering assembly further includes a first longitudinally-oriented coupling rod having a front end coupled to said rotatable steering shaft and a rear end, a second laterally-oriented coupling rod having a first end coupled to one of said rear wheels, and longitudinal-to-lateral translation means coupled to said rear end of said first coupling rod and said second coupling rod for translating longitudinal movement of said first coupling rod into lateral movement of said second coupling rod, whereby rotation of said handlebars causes longitudinal displacement of said first coupling rod, and said longitudinal-to-lateral translation means causes lateral displacement of said second coupling rod in response to the longitudinal displacement of said first coupling rod for rotating said one rear wheel about its respective vertical steering axis.

3. The tricycle of claim 2, further comprising a third laterally-oriented coupling rod, said second coupling rod having a second end attached to said longitudinal-to-lateral translation means, said third coupling rod coupled at one end to said one rear wheel and coupled at its other end to the other rear wheel, wherein the third coupling rod causes rotation of said other rear wheel about its respective vertical steering axis in response to the rotation of said one rear wheel about its vertical steering axis.

4. The tricycle of claim 1, wherein steering assembly further includes abutment means located immediately adjacent the rotatable steering shaft for physically limiting the angular displacement of the rotatable steering shaft with respect to said frame.

5. The tricycle of claim 1, further comprising a plurality of gears and a gear shifting lever, said gear shifting lever attached to said steering member, said plurality of gears and gear shifting lever permitting the user to selectively choose a desired gearing ratio between the pedal assembly and the front drive wheel.

6. The tricycle of claim 1, wherein said steering member comprises handlebars, said braking mechanism is a first braking mechanism for applying a braking force to the left rear wheel, said tricycle further comprising a second braking mechanism for applying a braking force to the right rear wheel, a first braking lever attached to the handlebars for selectively activating the first braking mechanism to apply a braking force to the left rear wheel, and a second braking lever attached to the handlebars for selectively activating the second braking mechanism to apply a braking force to the right rear wheel.

7. The tricycle of claim 6, further comprising a third braking mechanism for applying a braking force to the front drive wheel, and a third braking lever attached to the handlebars for selectively activating the third braking mechanism to apply a braking force to the front drive wheel.

8. The tricycle of claim 7, further comprising a transmission system, said transmission system including a plurality of gears and a gear shifting lever permitting the user to choose a desired gearing ratio between the pedal assembly and the front drive wheel, said gear shifting lever attached to said handlebars.

9. The tricycle of claim 1, further comprising seat adjustment means for permitting independent longitudinal and vertical adjustment of the seat with respect to the frame.

10. The tricycle of claim 9, wherein said steering member comprises handlebars, said tricycle further comprising handlebar adjustment means for permitting independent vertical and angular adjustment of the handlebars with respect to the frame.

11. The tricycle of claim 10, wherein said seat adjustment means also permits independent angular adjustment of the seat with respect to the frame.

12. The tricycle of claim 9, wherein the seat adjustment means includes a plurality of vertical telescopically mounted rods.

13. The tricycle of claim 1, wherein said seat is adjustable with respect to said frame to permit upright pedalling in a plurality of pedalling position angles in the range between 25° and 45°.

14. The tricycle of claim 1, wherein said frame includes a lowered step portion immediately longitudinally adjacent the seat providing a foot supporting surface for the user to step upon to facilitate mounting and dismounting of the tricycle.

15. An occupant-propelled tricycle intended for use by seniors or physically challenged riders, said tricycle comprising:

an elongated frame, said frame including a forward portion and a rearward portion;

a ground engaging front drive wheel, said front drive wheel mounted for rotation about a transverse horizontal axis at the forward portion of the frame;

right and left ground engaging rear wheels, said rear wheels each mounted for rotation about a transverse horizontal axis at the rearward portion of the frame, each said rear wheel further being rotatably attached to said frame for pivotal movement about a respective vertical steering axis;

a pedal assembly at least partially rearwardly displaced from said front drive wheel axis, said pedal assembly including a pair of pedals mounted for rotation about a transverse horizontal pedalling axis;

power coupling means coupled to the pedal assembly and the front drive wheel for transmitting rotational power therebetween;

a seat including a hip support section and a back support section, said seat being mounted to the frame longitudinally between the transverse horizontal axis of rotation of the rear wheels and the pedalling axis for supporting a user for upright pedalling of the tricycle;

a plurality of vertical telescopically mounted rods enabling independent vertical and angular adjustment of the seat with respect to the frame;

a plurality of seat mounting members coupled to said vertical telescopically mounted rods enabling longitudinal adjustment of the seat with respect to the frame;

said plurality of vertical telescopically mounted rods and said seat mounting members permitting independent vertical and longitudinal adjustment of said seat with respect to said frame for upright pedalling in a plurality of pedalling position angles in the range between 25° and 45° when said hip support section of said seat is substantially horizontally disposed;

a steering assembly, said steering assembly includes a rotatable steering shaft and a steering member attached thereto, said rotatable steering shaft coupled to both said rear wheels for angularly displacing each said rear wheel with respect to its respective vertical steering axis; and a braking mechanism for applying a braking force to at least one of said wheels.

16. The tricycle of claim 15, wherein said steering member comprises handlebars, said tricycle further comprising handlebar adjustment means for enabling independent vertical and angular adjustment of the handlebars with respect to the frame.

17. The tricycle of claim 16, wherein said braking mechanism is a first braking mechanism for applying a braking force to the left rear wheel, a second braking mechanism for applying a braking force to the right rear wheel, a third braking mechanism for applying a braking force to the front drive wheel, a first braking lever attached to the handlebars for selectively activating the first braking mechanism to apply a braking force to the left rear wheel, a second braking lever attached to the handlebars for selectively activating the second braking mechanism to apply a braking force to the right rear wheel, and a third braking lever attached to the handlebars for selectively activating the third braking mechanism to apply a braking force to the front drive wheel.

18. The tricycle of claim 17, further comprising a plurality of gears and a gear shifting lever, said gear shifting lever attached to said handlebars, said plurality of gears and gear shifting lever permitting the user to selectively choose a desired gearing ratio between the pedal assembly and the front drive wheel.

19. An occupant-propelled tricycle intended for use by seniors or physically challenged riders, said tricycle comprising:

an elongated frame, said frame including a forward portion and a rearward portion;

a ground engaging front drive wheel, said front drive wheel mounted for rotation about a transverse horizontal axis at the forward portion of the frame;

right and left ground engaging rear wheels, said rear wheels each mounted for rotation about a transverse horizontal axis at the rearward portion of the frame, each said rear wheel further being rotatably attached to said frame for pivotal movement about a respective vertical steering axis;

a pedal assembly at least partially rearwardly displaced from said front drive wheel axis, said pedal assembly including a pair of pedals mounted for rotation about a transverse horizontal pedalling axis;

power coupling means coupled to the pedal assembly and the front drive wheel for transmitting rotational power therebetween;

a seat adjustably mounted to the frame longitudinally between the transverse horizontal axis of rotation of the rear wheels and the pedalling axis for supporting a user for upright pedalling of the tricycle;

a rotatable steering shaft;

a steering member attached to said rotatable steering shaft;

abutment surfaces located immediately adjacent a lower portion of the rotatable steering shaft for physically limiting the angular displacement of the rotatable steering shaft with respect to said frame;

a first longitudinally-oriented coupling rod having a front end and a rear end, said front end coupled to said rotatable steering shaft;

a second laterally-oriented coupling rod having a first end and a second end, said first end coupled to one of said rear wheels;

a bracket pivotally mounted to said frame, said bracket attached to said rear end of said first coupling rod and said second end of said second coupling rod for translating longitudinal movement of said first coupling rod into lateral movement of said second coupling rod; and a third laterally-oriented coupling rod having a first end and a second end, said first end coupled to said one rear wheel, said second end coupled to the other rear wheel;

whereby rotation of said handlebars causes longitudinal displacement of said first coupling rod, rotation of said bracket, lateral displacement of said second coupling rod, lateral displacement of said third coupling rod, and the angular displacement of each said rear wheel with respect to its respective vertical steering axis.

20. The tricycle of claim 19, further comprising a first braking mechanism for applying a braking force to the left rear wheel, a second braking mechanism for applying a braking force to the right rear wheel, a third braking mechanism for applying a braking force to the front drive wheel, a first braking lever attached to the handlebars for selectively activating the first braking mechanism to apply a braking force to the left rear wheel, a second braking lever attached to the handlebars for selectively activating the second braking mechanism to apply a braking force to the right rear wheel, and a third braking lever attached to the handlebars for selectively activating the third braking mechanism to apply a braking force to the front drive wheel.

* * * * *